(12) United States Patent
Tamura et al.

(10) Patent No.: US 8,378,256 B2
(45) Date of Patent: Feb. 19, 2013

(54) SURFACE CRACK SEALING METHOD

(75) Inventors: Masataka Tamura, Yokohama (JP);
Yoshinobu Makino, Machida (JP);
Wataru Kono, Yokohama (JP);
Katsunori Shiihara, Yokohama (JP);
Yoshimi Tanaka, Chigasaki (JP);
Masaki Yoda, Yokohama (JP); Yoshio Hamamoto, Yokohama (JP); Satoshi Okada, Ota-Ku (JP); Hiromi Kato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 265 days.

(21) Appl. No.: 12/738,162

(22) PCT Filed: Oct. 16, 2008

(86) PCT No.: PCT/JP2008/068720
§ 371 (c)(1),
(2), (4) Date: Jun. 16, 2010

(87) PCT Pub. No.: WO2009/051164
PCT Pub. Date: Apr. 23, 2009

(65) Prior Publication Data
US 2010/0258540 A1    Oct. 14, 2010

(30) Foreign Application Priority Data
Oct. 16, 2007    (JP) ................................ 2007-269128

(51) Int. Cl.
*B23K 26/00*    (2006.01)

(52) U.S. Cl. ......... 219/121.64; 219/121.61; 219/121.62; 219/121.63; 219/121.65; 219/121.66; 219/121.76; 219/121.77

(58) Field of Classification Search ............. 219/121.61, 219/121.63, 121.64, 121.65, 121.66, 121.76, 219/121.77, 121.62
See application file for complete search history.

(56) References Cited

U.S. PATENT DOCUMENTS
4,507,540 A * 3/1985 Hamasaki ................ 219/121.64

FOREIGN PATENT DOCUMENTS
| JP | 54 153745 | 12/1979 |
| JP | 10-328862 | * 12/1998 |
| JP | 2003-320472 | * 11/2003 |
| JP | 2003 320472 | 11/2003 |

* cited by examiner

*Primary Examiner* — Tan N Tran
(74) *Attorney, Agent, or Firm* — Oblon, Spivak, McClelland, Maier & Neustadt, L.L.P.

(57) ABSTRACT

A method of sealing a surface crack in a member is provided includes steps of irradiating a region of the member at which the crack is produced with a heating laser beam so as to heat the region to a temperature lower than a melting point of the member, and then irradiating a region of the member at which the crack is produced with a welding laser beam subsequent to irradiation of the heating laser beam so as to heat the region to a temperature higher than or equal to the melting point of the member, thereby sealing an opening of the surface crack of the member.

6 Claims, 2 Drawing Sheets

SURFACE CRACK SEALING METHOD

TECHNICAL FIELD

The present invention relates to a surface crack sealing method for sealing a crack produced in a surface of a member constituting a nuclear reactor or any other similar structure by irradiating the surface of the member with a laser beam to melt the surface.

BACKGROUND ART

In a conventional technology, when cracks are produced in surfaces of members constituting a nuclear reactor or any other similar structures, for example, the constitutional member is entirely exchanged or a reinforcing member is placed. In order to repair a cracked portion itself, various methods have been proposed, such as a method in which a cracked portion is removed by mechanical machining or electrical discharge machining and then filling the cracked portion with a suitable material by using TIG arc welding or laser welding and a method in which only a surface crack is welded and sealed.

In conventional surface crack sealing methods, the surface of a structural member on which a surface crack is produced is irradiated with a laser beam to be melted and focused through a lens, and a filler wire is supplied as a filler metal to the portion melted by the laser beam. The surface of the crack is thus melted and sealed.

In the conventional methods described above, only when water, oxides, or other substances are not present inside a defect, which is a surface crack, the surface crack is sealed by melting the cracked portion.

However, if water, oxides, and other substances are present inside the surface crack, in the sealing methods mentioned above, a mixture thereof is vaporized when heated by the laser beam. In this process, the melted metal in the laser repaired portion is blown off and pits are generated. The pits left behind may prevent the surface crack from being sealed.

In a conventional technology, in consideration of the above matter, there is provided a method in which a preceding laser beam and a subsequent laser beam are scanned along a common path to allow the preceding laser beam to heat or melt a surface defect site so as to remove water or contaminants in the surface crack and the subsequent laser beam to melt the opening of the surface defect so as to seal the surface defect (see Japanese Patent Application Laid-Open Publication No. 2003-320472 (Patent Document 1), for example).

In the conventional technique described above, since two laser beams are focused through a common optical system, it is difficult to individually or independently control the diameters of the preceding and subsequent laser beams, and hence, the preceding laser beam heats and melts the surface. If the surface is melted and the surface defect is sealed, the water and oxides left in the crack are vaporized by the heat in the subsequent sealing/welding step and the vapor pressure increases, which may produce pits in the sealing/welding step in some cases.

DISCLOSURE OF THE INVENTION

The present invention has been made in view of the circumstances described above, and an object of the present invention is to provide a surface crack sealing method, at a time, when a crack is produced in a surface of a member, capable of sealing the surface crack in a satisfactory manner without leaving pits or other defects even in the presence of the water, oxides or other substances present in the crack.

The present invention provides, to achieve the object mentioned above, a surface crack sealing method in which a crack having an opening and produced in a surface of a member is irradiated with a laser beam along the crack so that a region of the member where the crack is produced is heated and melted to thereby seal the crack, the surface crack sealing method comprising the steps of: irradiating the region of the member where the crack is produced with a heating laser beam to heat the region to a temperature lower than a melting point of the member; and irradiating the region of the member where the crack is produced with a welding laser beam, which follows the heating laser beam irradiation, to heat the region to a temperature higher than or equal to the melting point of the member so as to seal the opening of the surface crack.

In further preferable embodiments, the following modes may be employed:

An average energy density of the heating laser beam is preferably no more than 1500 W/cm$^2$.

An average energy density of the welding laser beam is preferably no less than 7000 W/cm$^2$.

A distance between centers of the heating laser beam and the welding laser beam is preferably at least 10 mm in a direction in which the welding proceeds.

The heating laser beam and the welding laser beam are preferably transmitted through different optical fibers, respectively.

The crack is preferably sealed by applying the heating laser beam and the welding laser beam irradiated through different nozzles with a cover disposed therebetween.

A position at which the heating laser beam is applied and a position at which the welding laser beam is applied are preferably shifted from each other by at least 1 mm in a direction perpendicular to a welding line.

A laser beam transmitted through a single optical fiber is preferably divided thereafter by a half-mirror into the heating laser beam and the welding laser beam.

According to the present invention having the features described above, a surface crack can be sealed in a satisfactory manner with no pits or other detects left behind even when water, oxides and other substances are present in the surface crack.

BEST MODE FOR CARRYING OUT THE INVENTION

Hereunder, preferred embodiments of a surface crack sealing method according to the present invention will be described with reference to the accompanying drawings.

First Embodiment

Figure 1:
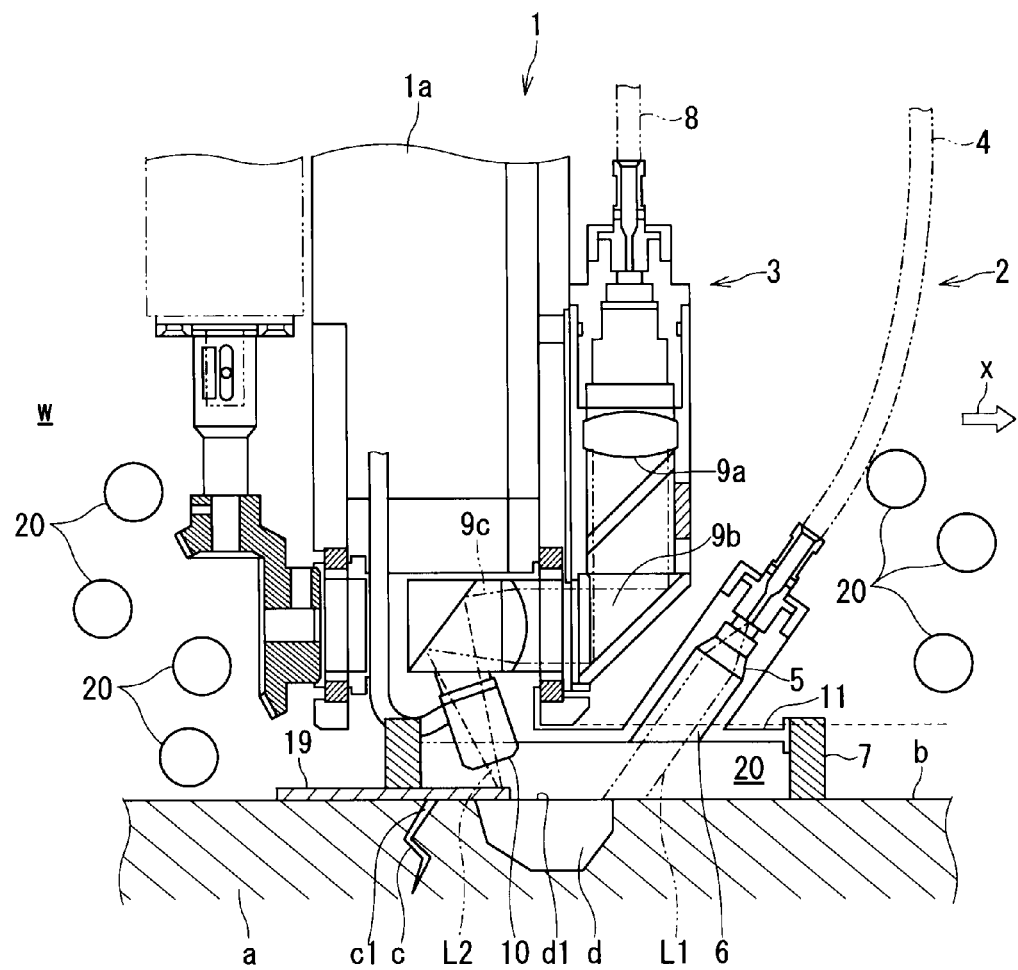
FIG. 1 is an illustrated cross-sectional view of an essential portion of an apparatus for performing a surface crack sealing method according to a first embodiment of the present invention.
Figure 2:
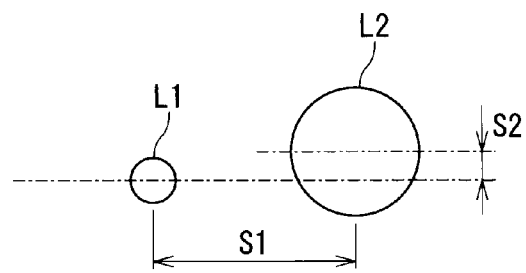
FIG. 2 is an illustrated descriptive view showing a positional relationship between laser beams in the first embodiment.
Figure 3:
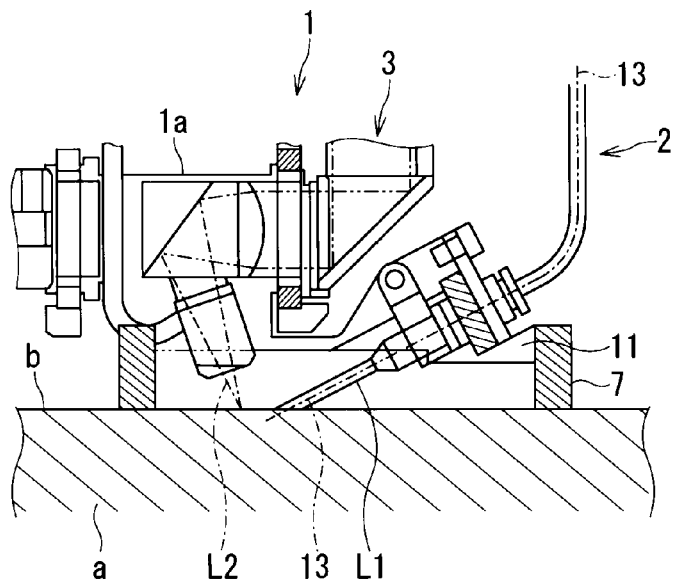
FIG. 3 is a descriptive view showing how to deliver a wire chip (filler wire) in the first embodiment.

FIGS. 1 to 3

FIG. 1 is a view for explaining a surface crack sealing method according to a first embodiment of the present invention and shows the configuration of an essential portion of a welding apparatus. FIGS. 2 and 3 are views for explaining functions of the welding apparatus.

As shown in FIG. 1, when a reactor is inspected, for example, a welding apparatus 1 is suspended in a reactor water "w" for the purpose of sealing cracks "c" and "d" having openings c1 and d1 and produced in a surface "b" of a member "a", which is a structural member constituting the reactor.

FIG. 1 shows a welding head 1a disposed at a lower end of the welding apparatus 1. The welding head 1a includes two sets of laser devices, first and second laser devices 2 and 3.

The first laser device 2 is a heating laser device and irradiates the regions of the member "a" where the cracks are produced with a heating laser beam L1 to heat the regions to a temperature lower than the melting point of the member "a". The heating laser device 2 is supported by a movable mount 7 provided at the lower end of the welding head 1a.

The heating laser device 2 includes a heating optical fiber 4, an optical system 5 and a nozzle 6 and moves at a predetermined speed in one direction (X direction in FIG. 1).

The second laser device 3 irradiates the regions of the member "a" where the cracks are produced with a welding laser beam L2, which follows the heating laser beam L1, to heat the regions to a temperature higher than or equal to the melting point of the member "a" so as to seal the openings c1 and d1 of the surface cracks "c" and "d". The welding laser device 3 includes a welding optical fiber 8, optical systems 9 (9a, 9b, and 9c), and a nozzle 10 and is supported by a side portion of the welding head 1a and the movable mount 7.

The heating optical fiber 4 and the welding optical fiber 8 are configured to be capable of coaxially supplying a shield gas 20 for converting the vicinity of a portion to be welded into a gaseous space.

A surface crack sealing method performing by using the welding apparatus of the structure described above will be specifically described.

As shown in FIG. 1, at the time of welding, the welding head 1a is suspended and positioned above the surface "b" of the member "a", and the movable mount 7 is positioned in the site where the cracks "c" and "d" are produced. The laser beams L1 and L2 transmitted through the heating optical fiber 4 and the welding optical fiber 8 are focused on the surface "b" of the member "a" through the optical systems 5 and 9, respectively.

The first optical system 5 supported by the movable mount 7 focuses and applies the laser beam L1 in an oblique direction as a heat source for heating the regions where the cracks "c" and "d" are produced while moving the movable mount 7 along one direction X over the regions where the cracks "c" and "d" are produced ahead of the subsequent laser beam L2.

In the present embodiment, the application of the laser beam L1 for heating before the welding process (heating laser beam L1) does not melt the surface of the member "a". To this end, the energy density of the heating laser beam L1 is set to be 1500 W/cm$^2$ or lower.

According to such heating water exiting in the cracks "c" and "d" is vaporized. That is, by vaporizing the water present on the base-material surface of the member "a" and in the cracks "c" and "d" by the irradiation of laser beam L1 allows the water in the cracks "c" and "d", which affects the sealing performance, to be reliably removed.

Although the welding is carried out in water, a gaseous space is formed by the shield gas 20 in the vicinity of the portion to be welded, and the heating optical fiber 4 and the welding optical fiber 8 are used to coaxially supply the shield gas 20. In FIG. 1, a plurality of circles indicate bubbles of the shield gas 20 removed from the cracks "c" and "d" and moving in the water "w".

Further, in the present embodiment, the heating laser beam L1 is followed by the laser beam L2 focused through the moving second optical system 9 on the regions of the member "a" where the cracks "c" and "d" are produced so that the regions are irradiated with the welding laser beam. The welding laser beam L2 is applied in an oblique direction from the side that is opposite to the side from which the heating laser beam L1 is applied.

In this way, a welding laser beam application step, in which the member "a" is heated to a temperature higher than or equal to the melting point thereof and the openings c1 and d1 of the surface cracks "c" and "d" are sealed, is carried out. The energy density of the welding laser beam L2 is set to be 7000 W/cm$^2$ or higher, and this laser beam L2 is preferably defocused for the irradiation, whereby a sealed and welded layer 19 can be formed.

According to the welding step or process mentioned above, the preceding heating laser beam L1 described above will not leave water or oxides in the cracks in the present embodiment, whereas pits tend to be produced at the time of sealing and welding in a conventional method, because the surface of the member "a" is directly melted, so that the surfaces of the cracks are sealed before the welding and the heating in the sealing and welding step vaporizes water and oxides left in the cracks to increase the vapor pressure, thus the present invention being advantageous.

On the other hand, since the increase in temperature of the base material and the interior of the cracks resulting from the application of the heating laser beam L1 is limited by the heat conductivity of the base material, the laser beam application conditions affect the maximum temperature at the depth of, for example, 5 mm, but hardly affect the time at which the maximum temperature is achieved.

Therefore, the increase in vapor pressure in the cracks at the time of sealing and welding is suppressed by carrying out sealing and welding process after the maximum temperature is achieved by applying the heating laser beam L1. For this purpose, the centers of the heating laser beam L1 and the welding laser beam L2 are separated by a distance S1 of at least 10 mm.

FIG. 2 shows the positions where the heating laser beam L1 and the welding laser beam L2 are applied. As shown in FIG. 2, the centers of the heating laser beam L1 and the welding laser beam L2 are separated by the distance S1 of at least 10 mm.

Further, the positions where the heating laser beam L1 and the welding laser beam L2 are applied are shifted from each other in the direction perpendicular to the welding line by at least 1 mm (S2), as shown in FIG. 2.

As mentioned above, by shifting the positions where the heating laser beam L1 and the welding laser beam L2 are applied from each other with respect to the laser application line by at least 1 mm, the sealed/welded layer 19 can be heated to thereby remove the water and oxides below the sealed/welded layer 19.

Further, in a case where the distance between the nozzle 10 through which the welding laser beam L2 is applied and the nozzle 6 through which the heating laser beam L1 is applied increases, water will flow in through the portion therebetween. In such case, even if the water is vaporized by the heating laser beam L1, the water will flow in again before the sealing and welding process. Then, in order to obviate such defect, a shield cover 11 is provided between the nozzles 6 and 10 to thereby prevent the water from invading through the portion between the nozzles 6 and 10.

Furthermore, the heating laser beam L1 and the welding laser beam L2 are transmitted through the different optical fibers 4 and 8 in the present embodiment.

FIG. 3 shows a method of using the filler wire 13. When the welding laser beam L2 is focused, to keep clear of the heating laser beam L1, the filler wire 13 is supplied through a wire tip to the position where the welding laser beam L2 is applied in a direction inclined to the direction in which the welding proceeds.

According to the surface crack sealing method of the present embodiment described above, the water and oxides in the surface cracks "c" and "d" having the openings c1 and d1 in the surface of the member "a" can be vaporized and removed before the welding by irradiating the surface cracks "c" and "d" with the heating laser beam L1 to heat the base-material surface "b" as well as the surface crack "c" and "d". No water or oxides will therefore be vaporized by the heat at the time of sealing and welding, whereby the surface cracks can be sealed in a satisfactory manner with no pits or other defects left behind.

Second Embodiment

FIG. 4

In this second embodiment, a surface crack sealing method, in which a laser beam L transmitted through a single optical fiber 14 is divided by a half-silvered mirror 17 into the heating laser beam L1 and the welding laser beam L2, will be described.

Figure 4:
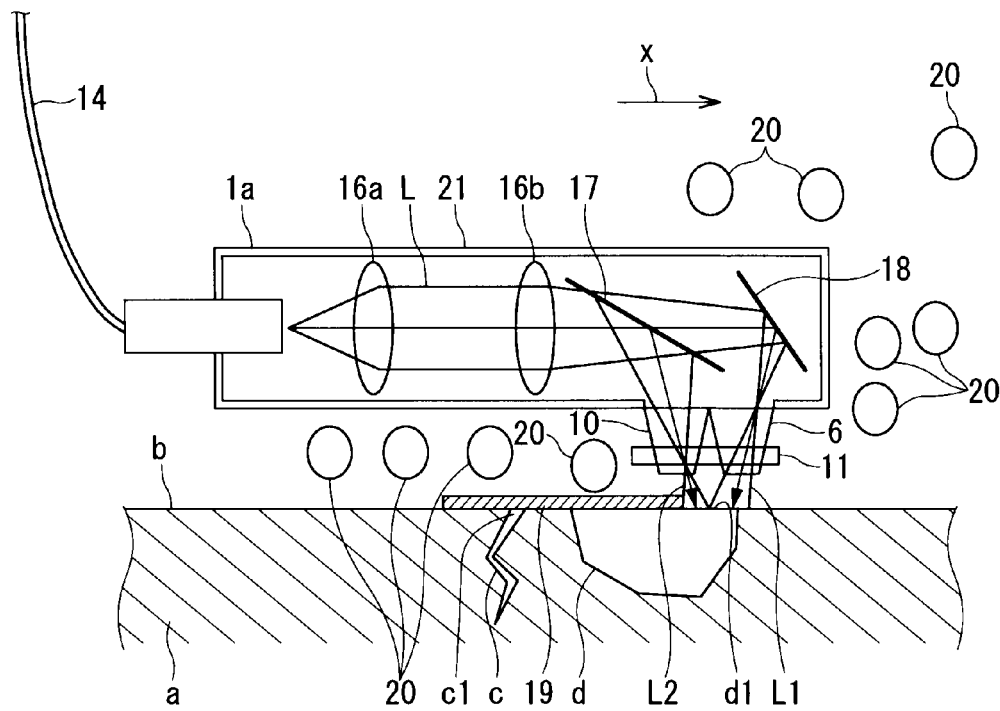
FIG. 4 is an illustrated cross-sectional view of an essential portion of an apparatus for performing a surface crack sealing method according to a second embodiment of the present invention.

In the present embodiment, only the way of applying the heating laser beam L1 and the welding laser beam L2 differs from that in the first embodiment, and accordingly, the same reference numerals are added to portions and/or members in FIG. 4 corresponding to those in FIG. 1 representing the first embodiment, and duplicated explanations are omitted herein.

As shown in FIG. 4, in the present embodiment, the half-mirror 17 and a total reflection mirror 18 are provided in a casing 21 that houses the welding head 1a, unlike the first embodiment. The half-mirror 17 and the total reflection mirror 18 are used to divide the laser beam L transmitted through the single optical fiber 14 into the heating laser beam L1 and the welding laser beam L2, which are then focused.

In the present second embodiment as well as in the first embodiment, the water and oxides in the surface cracks "c" and "d" having openings in the surface of the member are vaporized before the welding process by irradiating the surface cracks "c" and "d" with the heating laser beam L1 to heat the base-material surface as well as the surface cracks "c" and "d". Because of this manner, the water or oxides will be suppressed from being vaporized by the heat at the time of welding, whereby the surface cracks can be sealed in a satisfactory manner with no pits or other defects left behind. Further, since the number of components can be reduced in comparison with those in the first embodiment, the welding head can be made compact and lightweight for easy handling.

The invention claimed is:

1. A surface crack sealing method of sealing a crack in a surface of a member, comprising the steps of:
   irradiating a region of the member where the crack is present with a heating laser beam to heat the region to a temperature lower than a melting point of the member; and
   irradiating the region of the member where the crack is present with a welding laser beam irradiated along the crack, which follows the heating laser beam irradiation and after reaching a maximum heating temperature by the heating laser beam radiation, to heat the region to a temperature higher than or equal to the melting point of the member, so as to melt the member and seal an opening of the surface crack.

2. The surface crack sealing method according to claim 1, wherein an average energy density of the heating laser beam is no more than 1500 W/cm$^2$.

3. The surface crack sealing method according to claim 1, wherein a distance between centers of the heating laser beam and the welding laser beam is at least 10 mm in a direction in which the welding proceeds.

4. The surface crack sealing method according to claim 1, wherein a position at which the heating laser beam is applied and a position at which the welding laser beam is applied are shifted from each other by at least 1 mm in a direction perpendicular to a welding line.

5. The surface crack sealing method according to claim 1, wherein a laser beam transmitted through a single optical fiber is divided thereafter by a half-mirror into the heating laser beam and the welding laser beam.

6. The surface crack sealing method according to claim 1, wherein said step of irradiating a region of the member where the crack is present with a heating laser beam to heat the region to a temperature lower than a melting point of the member is continued sufficiently to substantially remove water and oxides in the crack.

* * * * *